Sept. 26, 1967     R. A. SMITH     3,344,034
CONTROL DEVICE FOR NUCLEAR REACTORS
Filed June 15, 1962     3 Sheets-Sheet 1
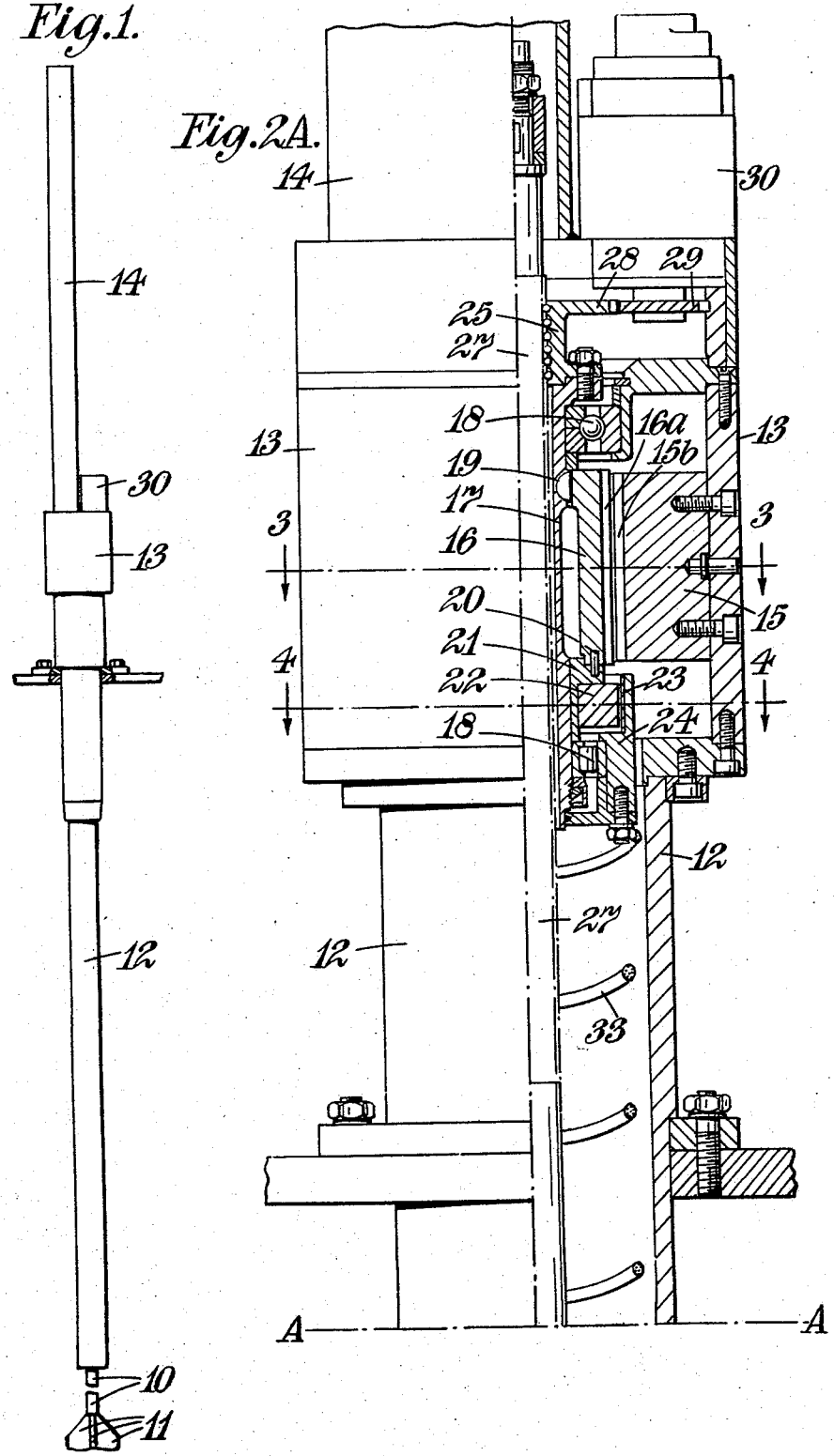

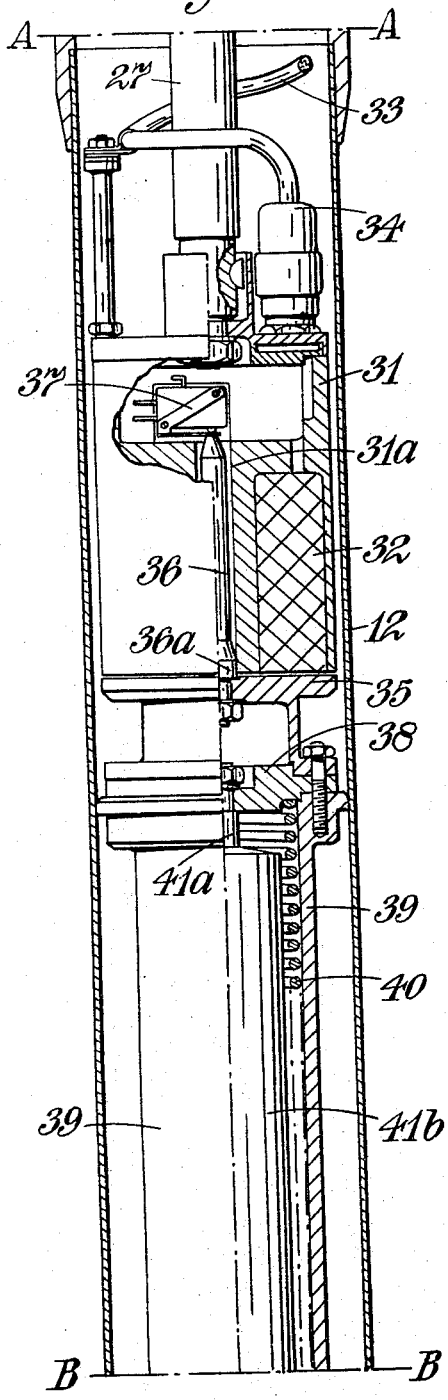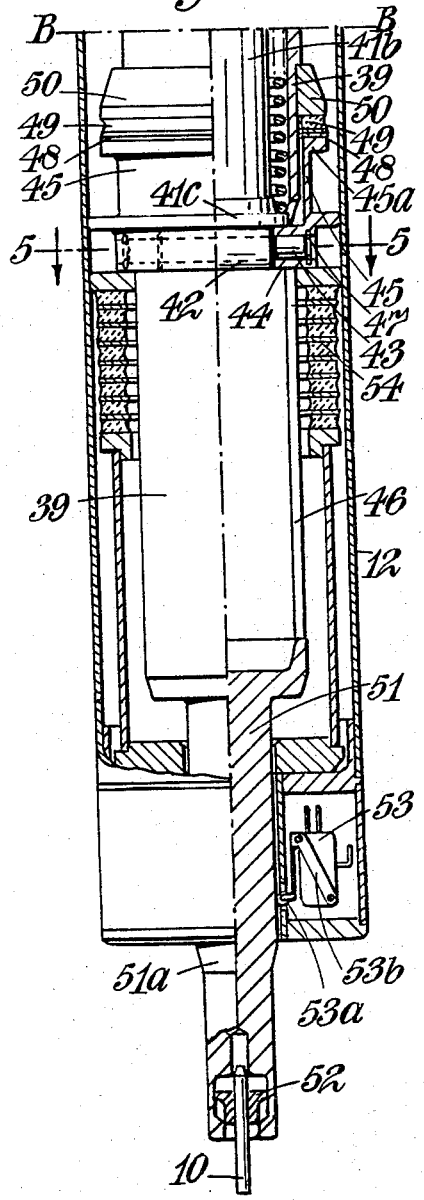

United States Patent Office 3,344,034
Patented Sept. 26, 1967

3,344,034
CONTROL DEVICE FOR NUCLEAR REACTORS
Robert Arthur Smith, Letchworth, England, granted to U.S. Atomic Energy Commission under the provisions of 42 U.S.C. 2182
Filed June 15, 1962, Ser. No. 202,759
Claims priority, application Great Britain, June 29, 1961, 23,630/61
3 Claims. (Cl. 176—36)

This invention comprises improvements in or relating to nuclear reactors and is concerned more particularly with reactivity controls of the class (hereinafter referred to as the class specified) comprising a rod-like member having at least portions thereof formed of neutron absorber material and feed means by which the extent of penetration of the rod into the reactor core is varied thereby to vary the neutron absorption by the rod-like member and thus the reactivity of the reactor.

According to the present invention, in a reactivity control of the class specified, the rod-like member is coupled for movement with a feed member of the feed means through electromagnet means which on de-energization releases the rod-like member for rapid insertion into the reactor core. Under normal operating conditions, the electromagnet is energized and the rod-like member is connected to and follows the movements of the feed member, but under scram conditions, the electromagnet is de-energized releasing the rod-like member and allowing it to move rapidly, for example by falling under gravity, into the position of maximum neutron absorption.

According to a preferred feature of this invention, the feed member is in the form of a lead screw engaging a nut device, for example of the recirculating ball type, the nut device being located against movement in the direction of the length of the lead screw and being rotatable by a vernier motor whereby accurate control of the position of the rod member can be effected in normal operation. In such an arrangement, an energizing coil of the electromagnet means may be carried at an end of the lead screw and an armature of the electromagnet means may be mounted on an adjacent end of the rod member.

According to a feature of this invention, the rod member may form part of a rod assembly which includes in its length a shock absorber, for example of the hydraulic type, to cushion the fall of the rod member when it is dropped under scram conditions. The control may also incorporate a resilient buffer against which the rod member impinges at the lower end of its travel when it is dropped under scram conditions.

Figure 3:
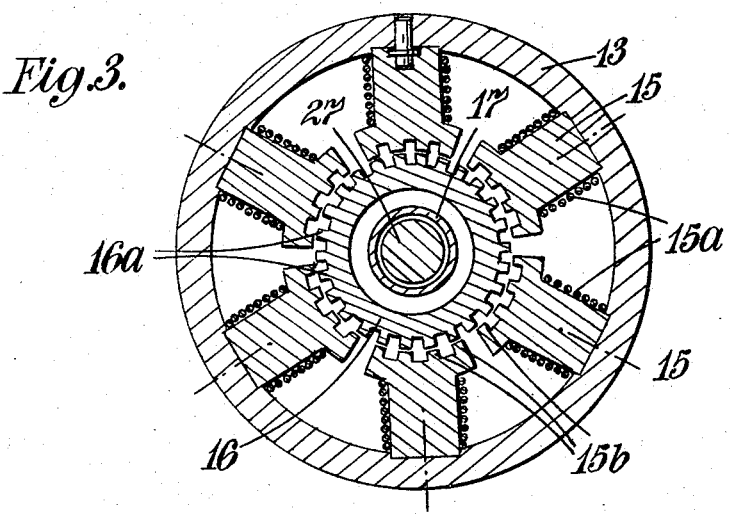
Figure 4:
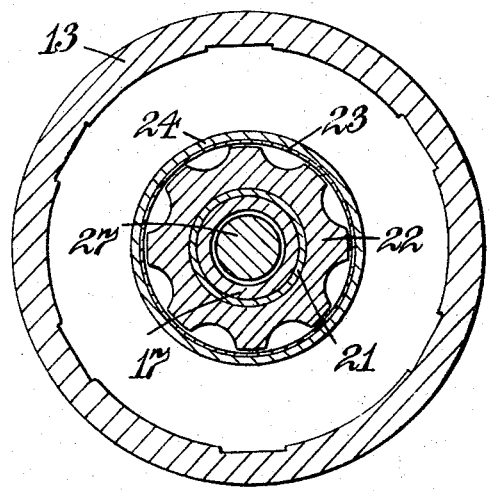
Figure 5:
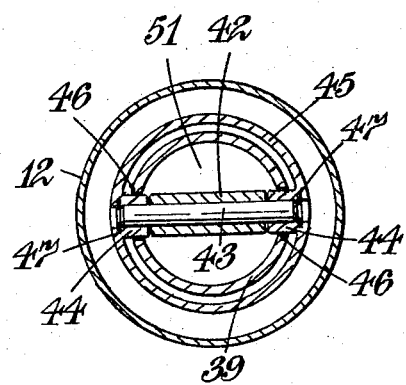

One construction of reactivity control embodying the above and other features of this invention will now be described with reference to the acompanying drawings in which:

FIGURE 1 shows the reactivity control in external view,

FIGURES 2A, 2B and 2C together form a view like FIGURE 1 but drawn to a larger scale and partly in section, FIGURES 2A and 2B joining on the lines AA and FIGURES 2B and 2C joining on the lines BB, FIGURES 3 and 4 are sections on the lines 3—3, 4—4 respectively of FIGURE 2A, and FIGURE 5 is a section on the line 5—5 of FIGURE 2C.

Referring to FIGURE 1, the reactivity control comprises a rod 10 carrying at its lower end a series of blades 11 of neutron absorber material and projecting at its upper end into a casing 12 into engagement with feed means which includes a vernier motor accommodated in a casing 13 from the upper side of which projects a casing 14 housing electric cables, position indicating switch gear and guide bars for part of the feed means.

In use, the rod 10 and blades 11 are raised to withdraw the blades from the reactor core (not shown) to increase the reactivity of the nuclear reactor, and are lowered into the core when it is desired to decrease the reactivity. Under scram conditions, the rod 10 and blades 11 are rapidly lowered into the core to the maximum extent.

Referring now to FIGURES 2A to 5, the construction is shown in more detail with the parts in the fully inserted position of the blades 11.

The feed means is shown in FIGURES 2A, 2B, 3 and 4. The vernier motor (FIGURES 2A and 3) comprises a stator consisting of pole pieces 15 secured to the casing 13 and each carrying a winding 15a, the pole pieces 15 projecting radially inwards from the casing 13 and having each a series of four equally spaced teeth 15b on its inner end. The motor also comprises an annular rotor 16 having on its external surface a series of teeth 16a which have a spacing equal to the spacing of the teeth 15b. To rotate the rotor 16 current is supplied in turn to diametrically opposite pairs of the windings 15a and movement of the rotor 16 occurs until its teeth 16a are aligned radially with the teeth 15b of the energized poles 15. Thus the rotor 16 can be moved in small angular steps.

The rotor 16 is mounted on a hollow spindle 17 which is mounted in upper and lower bearings 18 in the casing 13, a key 19 being provided to connect the rotor 16 and spindle 17 so that they rotate together. At its lower end, the rotor 16 is connected by torque-transfer pins 20 to a sleeve 21 which is secured to the spindle 17. The sleeve 21 also carries a multipole magnet 22 (FIGURES 2A and 4) which is encircled by a copper liner 23 supported in an extension of a housing 24 for the lower bearing 18.

At its upper end the spindle 17 has secured to it a nut device 25 of the recirculating ball type which engages a lead screw 27 constituting the feed member of the feed means. The magnet 22 and copper liner 23 constitute a brake preventing rotation of the feed means under the action vertical loads on the lead screw 27 which loads tend to cause rotation of the nut device 25. The nut device 25 is formed with a pinion 28 which meshes with a pinion 29 forming the input of a position indicating device 30.

The lead screw 27 extends downwardly into the casing 12 and carries at its lower end (FIGURE 2B) a housing 31 containing the energizing coil 32 of an electromagnet, the coil being fed with energizing current by a cable 33 which extends upwardly in a spiral from a connecting plug and socket 34. The armature 35 of the electromagnet is connected with a rod member 10 in a manner described below and carries an alignment pin 36 which extends upwardly in a bore 31a in the housing 31 to engage a microswitch 37 which is connected in an indicator circuit; when the switch 37 is closed by the pin 36 an indication is obtained that the armature 35 (and thus the parts connected to it) are properly positioned on the end of the lead screw 27. The pin 36 has an enlarged root 36a which fits snugly in the bore 31a to centre the armature 35 with respect to the housing 31.

The armature 35 has secured to it a plate 38 and a downwardly extending tube 39 (FIGURES 2B, 2C) which houses a spring 40 surrounding a hydraulic shock absorber. The shock absorber has a piston member 41a which is secured to the plate 38, and a relatively telescoping cylinder member 41b which is formed at its lower end with a bored swelling 42, the bore of which received a transversely extending pin 43 (FIGURES 2C and 5). The ends of the pin 43 engage bosses 44 formed internally of a guide sleeve 45 encircling the tube 39, the bosses 44 projecting through slots 46 formed in the lower part of the tube 39. Spring circular clips 47 retain the pin 43 in position. The spring 40 at its upper end bears against the plate 38 (FIGURE 2B) and at its lower end against the flange 41c on the lower end of the cylinder 41b and thus the spring 40 tends to elongate the hydraulic shock absorber 41a, 41b. The guide sleeve 41 has a flange 45a which, in the position of the parts as shown, is slightly spaced from an auxiliary buffer secured to the tube 39 and comprising a ring 48 bonded to a rubber annulus 49 which is in turn bonded to a ring 50 fitted on the tube 39.

The lower end of the tube 39 has secured to it an end fitting 51, the lower end of which has a socket 52 receiving the upper end of the rod member 10. The external surface of the fitting 51 is stepped to act as a cam for operating a switch 53 controlling a circuit indicating that the control blades 11 are fully inserted into the reactor core.

The lower portion of the casing 12 houses a resilient bottom buffer 54 consisting of a stack of metal and rubber rings arranged alternately and bonded together. When the blades 11 are fully inserted the guide sleeve 45 rests on the bottom buffer 54.

In use, starting with the parts in the positions shown, the rod member assembly, which comprises the rod 10, the blades 11, the hydraulic shock absorber 41a, 41b, the guide sleeve 45, the tube 39 and the armature 35 is raised to increase the reactivity of the reactor by energizing the electromagnet coil 32, so coupling the rod member assembly to the lead screw 27, and by rotating the nut device 25 by energizing the vernier motor windings 15a in rotation. After a short upward travel switch 53 is operated a roller 53a on the switch arm 53b travelling down step 51a so as to give an indication that the blades 11 are no longer fully inserted in the reactor core.

During the first part of the resulting upward movement of the lead screw 27, the guide sleeve 45 is maintained in contact with the bottom buffer 54 due to expansion of the hydraulic shock absorber 41a, 41b, under the action of the spring 40 and the bosses 44 consequently travel along the slots 46. When the bosses 44 reach the bottoms of the slots 46, expansion of the shock absorber 41a, 41b terminates and the guide sleeve 45 then partakes of any further upward movement of the tube 39.

During this movement also the upper end of the lead screw 27 enters the casing 14 (FIGURE 2A) where it is guided by suitable guide structure in the casing 14 and also operates switch gear accommodated in the casing 14.

To reduce the reactivity the order in which the motor windings 15a are energized is reversed and the lead screw 27 travels downwards.

The use of a vernier motor allows the control adjustment to be accurately performed.

Assuming that the parts are not in the fully-inserted setting, the blades 11 may be fully inserted rapidly for scram purposes by de-energizing the electromagnet coil 32 so freeing the rod member assembly from the lead screw 27. The rod member assembly immediately falls under gravity to the fully inserted position of the blades 11.

During this movement, the guide sleeve 45 engages the bottom buffer 54 so stopping the cylinder 41b of the hydraulic shock absorber, the shock being cushioned by the buffer 54, and further downward movement of the tube 39 and rod 10 causes telescoping of the shock absorber 41a, 41b and compression of the spring 40 so cushioning the fall of the assembly. In the event that the tube 39 and rod 10 tend to travel downwardly past the position shown the ring 48 of the auxiliary buffer abuts the flange 45a of the guide sleeve 45 so arresting movement of the parts, the shock being absorbed by the annulus 49 and the buffer 54.

I claim:
1. A reactivity control for a nuclear reactor comprising a rod-like member at least portions thereof are formed of neutron absorbing material, a leadscrew, a recirculating ball unit threadably engaging the said leadscrew and located against movement axially of the leadscrew, a vernier motor connected to the recirculating ball unit to impart stepwise angular movement thereto, electromagnet means comprising a solenoid carried at one end of the leadscrew, a rod-like armature mounted at one end of the rod-like member adjacent the said one end of the leadscrew, and indicating means indicating the engagement of the said rod-like armature within the said solenoid when the latter is energized, so that the rod-like member is coupled for movement with the leadscrew, the said rod-like armature being released on de-energization of the solenoid so that the rod-like member is freed for rapid insertion into the reactor.

2. A reactivity control for a nuclear reactor comprising a rod assembly, a leadscrew, a nut device threaded on the said leadscrew and located against movement axially of the leadscrew, a vernier motor connected to the nut device to impart stepwise angular movement thereto, electromagnet means comprising a coil attached to the leadscrew and an armature attached to the rod assembly, and a fixed resilient buffer, the rod assembly comprising a rod-like member at least portions thereof are formed of neutron absorbing material, and a hydraulic shock absorber which comprises first and second relatively telescoping members and a spring urging the said relatively telescoping members apart, the rod assembly being coupled for movement with the leadscrew on energization of the coil, and the rod assembly being released for movement into the reactor on de-energization of the coil so that the second relatively telescoping member engages the said resilient buffer towards the end of the movement of the rod assembly to arrest the same.

3. A reactivity control for a nuclear reactor comprising a rod assembly, a leadscrew, a nut device threaded on the said leadscrew and located against movement axially of the leadscrew, a vernier motor connected to the nut device to impart stepwise angular movement thereto, electromagnet means comprising a coil attached to the leadscrew and an armature attached to the rod assembly, and a fixed resilient buffer, the rod assembly comprising a rod-like member at least portions thereof are formed of neutron absorbing material, a hydraulic shock absorber, a tube surrounding the said hydraulic shock absorber, a sleeve surrounding at least part of the said tube, longitudinal slots in the said tube, and a pin extending through the said longitudinal slots and connected to the said sleeve, the hydraulic shock absorber comprising first and second relatively telescoping members, of which the second member is connected to the said pin so that the rod assembly is coupled for movement with the leadscrew when the coil is energized and the rod assembly is released for movement into the reactor on de-energization of the coil, the said sleeve impinging on the said resilient buffer when the rod assembly nears the end of its movement so that the movement of the rod assembly is arrested.

References Cited

Schultz: "Control of Nuclear Reactors and Power Plants," 1961, pp. 228, 229, 238, 244, published by McGraw-Hill.

BENJAMIN R. PADGETT, *Primary Examiner.*

REUBEN EPSTEIN, CARL D. QUARFORTH,
*Examiners.*

M. R. DINNIN, H. E. BEHREND, *Assistant Examiners.*